United States Patent
Yamamoto

(10) Patent No.: US 12,011,957 B2
(45) Date of Patent: Jun. 18, 2024

(54) PNEUMATIC TIRE

(71) Applicant: Sumitomo Rubber Industries, Ltd., Kobe (JP)

(72) Inventor: Tetsuya Yamamoto, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 385 days.

(21) Appl. No.: 17/213,863

(22) Filed: Mar. 26, 2021

(65) Prior Publication Data

US 2021/0323358 A1 Oct. 21, 2021

(30) Foreign Application Priority Data

Apr. 21, 2020 (JP) ................................. 2020-075600

(51) Int. Cl.
| | |
|---|---|
| *B60C 9/02* | (2006.01) |
| *B60C 3/00* | (2006.01) |
| *B60C 15/06* | (2006.01) |
| *B60C 15/00* | (2006.01) |

(52) U.S. Cl.
CPC ............ *B60C 9/0292* (2013.01); *B60C 3/00* (2013.01); *B60C 15/0607* (2013.01); *B60C 15/0018* (2013.01); *B60C 15/0036* (2013.01); *B60C 2015/061* (2013.01); *B60C 2015/0621* (2013.01); *Y10T 152/10837* (2015.01)

(58) Field of Classification Search
CPC .................................................. B60C 9/0292
See application file for complete search history.

(56) References Cited

U.S. PATENT DOCUMENTS 5,772,811 A * 6/1998 Ueyoko ................ B60C 9/0292
152/454 X

FOREIGN PATENT DOCUMENTS

| EP | 1066988 A2 | 1/2001 |
| EP | 3 281 805 A1 * | 2/2018 |
| JP | 4-317803 A | 11/1992 |
| JP | 2004-17692 A | 1/2004 |
| WO | WO-2016/068906 A1 * | 5/2016 |
| WO | WO2016/068908 A1 | 5/2016 |

OTHER PUBLICATIONS

English machine translation of JP 4-317803 A, Nov. 9, 1992.*
English machine translation of JP 2004-17692 A, Jan. 22, 2004.*
Extended European Search Report, dated Aug. 26, 2021, for European Application No. 21162521.5.

* cited by examiner

*Primary Examiner* — Adrienne C. Johnstone
(74) *Attorney, Agent, or Firm* — Birch, Stewart, Kolasch & Birch, LLP

(57) ABSTRACT

A pneumatic tire includes a tread portion, a pair of sidewall portions, a pair of bead cores, a carcass layer, a pair of first bead apex rubber components, and a belt layer disposed outward of the carcass layer. In an unloaded condition where the tire is mounted onto a standard rim and inflated with an internal pressure at 50 kPa, the carcass layer has a profile that includes an outer side portion extending from a position (A) where the carcass layer separates from the belt layer to a maximum width position (B) of the carcass layer, and the pair of outer side portion is located outside a virtual arc (C0) having a single radius (R0) of curvature passing through the position (A), the maximum width position (B), and an outermost ends in the tire radial direction of one of the pair of first bead apex rubber components.

14 Claims, 4 Drawing Sheets

PNEUMATIC TIRE

RELATED APPLICATION

This application claims priority to Japanese Patent Application JP2020-075600. The entire contents of that application are incorporated by reference herein.

BACKGROUND ART

Field of the Invention

The present invention relates to a pneumatic tire.

Description of the Related Art

Conventionally, a technique that prevents separation at edges of a belt ply by making an outer wall of a tire at a specific position bulge outwardly when the internal pressure of a tire changes from 5% to 100% of the standard internal pressure has been known (see, for example, Patent Document 1).

PATENT DOCUMENT

[Patent document 1] Japanese Unexamined Patent Application Publication H04-317803

SUMMARY OF THE INVENTION

Unfortunately, in recent years, it has been required to reduce rolling resistance of the above-mentioned pneumatic tire.

The present invention has been made in view of the above circumstances and has a main object to provide a pneumatic tire capable of reducing rolling resistance easily.

In one aspect of the present invention, a pneumatic tire includes a tread portion, a pair of sidewall portions, a pair of bead cores, a carcass layer including at least one carcass ply extending between the pair of bead cores through the tread portion and the pair of sidewall portions, a pair of first bead apex rubber components arranged disposed outward in a tire radial direction of the pair of bead cores, and a belt layer disposed outward in the tire radial direction of the carcass layer. In an unloaded condition where the tire is mounted onto a standard rim and inflated with an internal pressure at 50 kPa, the carcass layer has a profile that includes an outer side portion, the outer side portion extending from a position A where the carcass layer separates from the belt layer near an outer end of the belt layer in the tire axial direction to a maximum width position B of the carcass layer, and the pair of outer side portion is located outside a virtual arc C0 having a single radius R0 of curvature passing through the position A, the maximum width position B, and an outermost end in the tire radial direction of one of the pair of first bead apex rubber components.

In another aspect of the present invention, an entire tire outer surface in an unloaded condition where the tire is mounted onto the standard wheel rim and inflated with a standard internal pressure, except for a portion that is in contact with the standard wheel rim, may be located outside a tire outer surface in the unloaded condition where the tire is mounted onto the standard wheel rim and inflated with the internal pressure at 50 kPa.

In another aspect of the present invention, in the unloaded condition where the tire is mounted onto the standard rim and inflated with the internal pressure at 50 kPa, the profile may include an inner side portion extending from the maximum width position B to the outermost end C, and a radius R2 of curvature of the inner side portion may be in a range from 0.8 to 0.95 times the radius R1 of curvature of the outer side portion.

In another aspect of the present invention, a distance H1 in the tire radial direction from a bead baseline to the maximum width position B may be in a range from 0.40 to 0.50 times a maximum distance in the tire radial direction from the bead baseline to the profile.

In another aspect of the present invention, a difference $\alpha1-\alpha2$ between an angle $\alpha1$ of the carcass layer with respect to a tire axial direction at the outermost end C in the unloaded condition where the tire is mounted onto the standard wheel rim and inflated with the standard internal pressure and an angle $\alpha2$ of the carcass layer with respect to the tire axial direction at the outermost end C in a loaded condition where the tire is mounted onto the standard wheel rim with the standard internal pressure and loaded with a standard tire load may be 0 to 15 degrees.

In another aspect of the present invention, a length in the tire radial direction of the pair of first bead apex rubber components may be in a range from 10 to 25 mm.

In another aspect of the present invention, the carcass ply may include a main portion extending between the pair of bead cores, and a pair of turn-up portions turned up around the pair of bead cores from inside to outside of the tire, and a pair of second bead apex rubber components may be disposed outward in the tire axial direction of the pair of turn-up portions.

In another aspect of the present invention, an outermost end of the pair of second bead apex rubber components may be located inwardly in the tire radial direction of the maximum width position B.

In another aspect of the present invention, an innermost end in the tire radial direction of the pair of second bead apex rubber components may be located outwardly in the tire radial direction of the bead baseline.

DESCRIPTION OF THE PREFERRED EMBODIMENTS

An embodiment of the present invention will be explained below with reference to the accompanying drawings.

Figure 1:
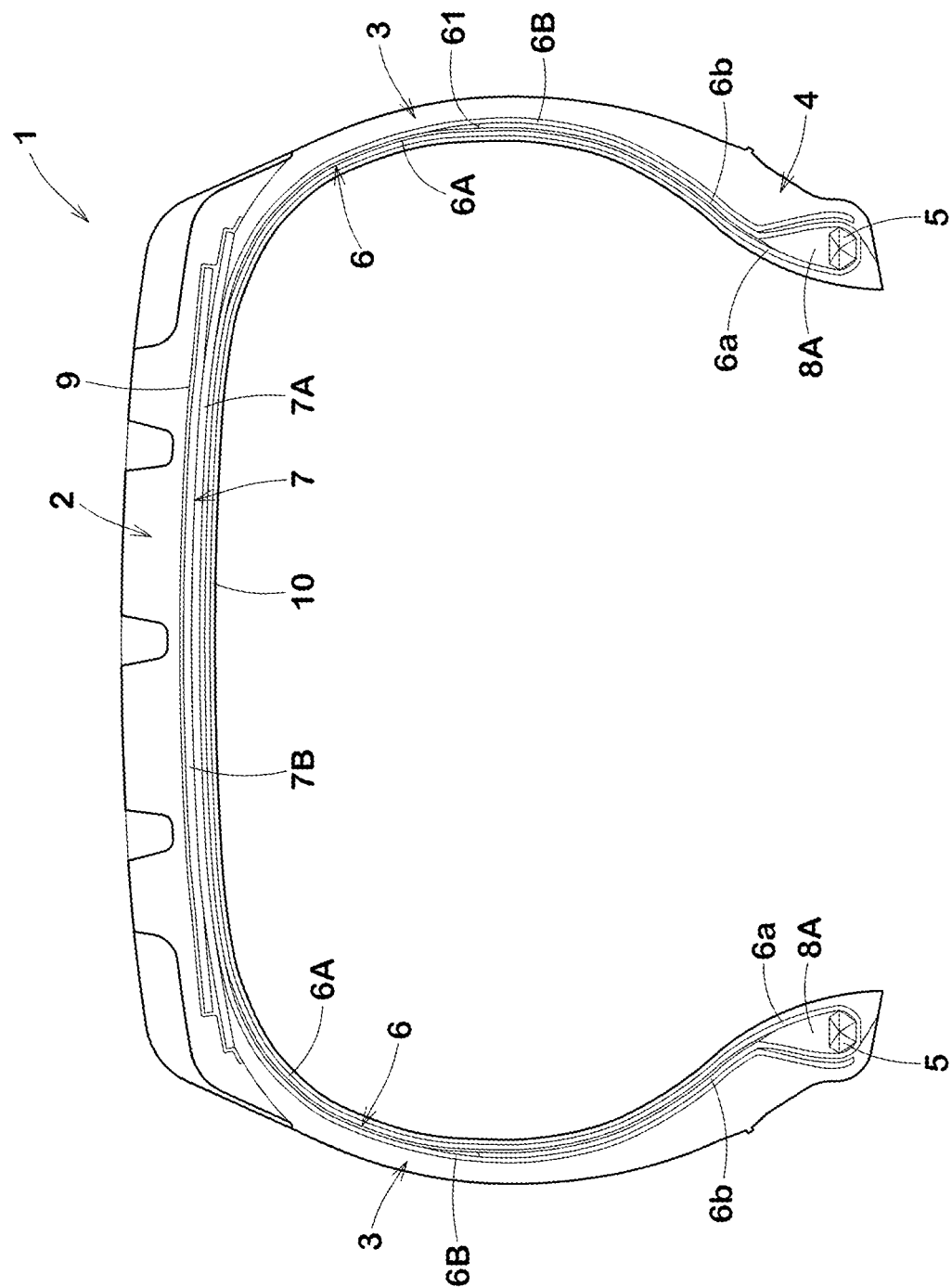
FIG. 1 is a meridian cross-sectional view of a pneumatic tire according to a present embodiment.

FIG. 1 is a meridian cross-sectional view of a pneumatic tire 1 including a tire axis (not shown) under a standard condition according to a present embodiment.

As used herein, the "standard condition" is such that the tire 1 is mounted onto a standard wheel rim R (shown in FIG. 3) and inflated with a standard internal pressure but loaded with no tire load. Hereinafter, unless otherwise noted, dimensions of the pneumatic tire 1 are measured in the standard condition.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example. Hereinafter, the standard wheel rim R may simply refer to as "rim".

As used herein, the "standard internal pressure" is a standard internal pressure officially approved for each tire by standards organizations on which the pneumatic tire 1 is based, wherein the standard internal pressure is the "maximum air pressure" in JATMA, the maximum pressure given in the "tire Load Limits at Various Cold Inflation Pressures" table in TRA, and the "Inflation Pressure" in ETRTO, for example. When the pneumatic tire 1 is a passenger car tire, the standard internal pressure may be defined as 180 kPa, for example.

The pneumatic tire 1 according to the present embodiment is suitably used for a light truck radial tire having a standard internal pressure of 350 to 600 kPa. The pneumatic tire 1 includes a pair of the bead cores 5, a carcass layer 6, a belt layer 7, and a pair of first bead apex rubber components 8A.

The pair of bead cores 5 is disposed in a pair of bead portions 4. The bead cores 5, for example, are formed into a polygonal cross-section in which steel bead wires (not shown) are wound in multiple turns.

The carcass layer 6 includes at least one carcass ply. The carcass ply, for example, includes a plurality of carcass cords coated with a topping rubber. As the carcass cords, organic fibers such as polyester fiber, nylon fiber, rayon fiber, polyethylene naphthalate fiber and aramid fiber, or steel cord may be employed, for example.

The carcass layer 6 according to the present embodiment includes a carcass ply 6A and a carcass ply 6B. The carcass layer 6 may include a rubber sheet between the topping rubbers of the carcass plies 6A and 6B if the carcass layer includes the carcass plies 6A and 6B. The carcass ply 6A extending between the pair of bead cores 5 through the tread portion 2 and a pair of sidewall portions 3. The carcass ply 6B is disposed outward of the carcass ply 6A.

The belt layer 7 is disposed outward in the tire radial direction of the carcass layer 6. The belt layer 7 includes at least one belt ply. In the present embodiment, the belt layer 7 is composed of two belt plies 7A and 7B superimposed in the tire radial direction. Each of the belt plies 7A and 7B, for example, includes a plurality of belt cords coated with a topping rubber. Preferably, as the belt cords of the belt plies 7A and 7B, high elasticity cords such as steel cord may be employed.

The first bead apex rubber components 8A are disposed outward in the tire radial direction of the bead cores 5. The first bead apex rubber components 8A are formed in a substantially triangular cross section that tapers outward in the tire radial direction.

A band layer 9 may be disposed outward in the tire radial direction of the belt layer 7. The band layer 9 is composed of one or more band layers which include organic fiber cords oriented at a small angle, e.g., 10 degrees or less, with respect to the tire circumferential direction. As the band plies, a jointless band formed by spirally winding a band cord or a ribbon-shaped band-shaped ply, or a spliced ply may be employed.

Note that an inner liner layer 10 is formed inward of the carcass layer 6, i.e., on the tire inner cavity surface. The inner liner layer 10 is made of air-impermeable rubber to retains the internal pressure.

Figure 2:
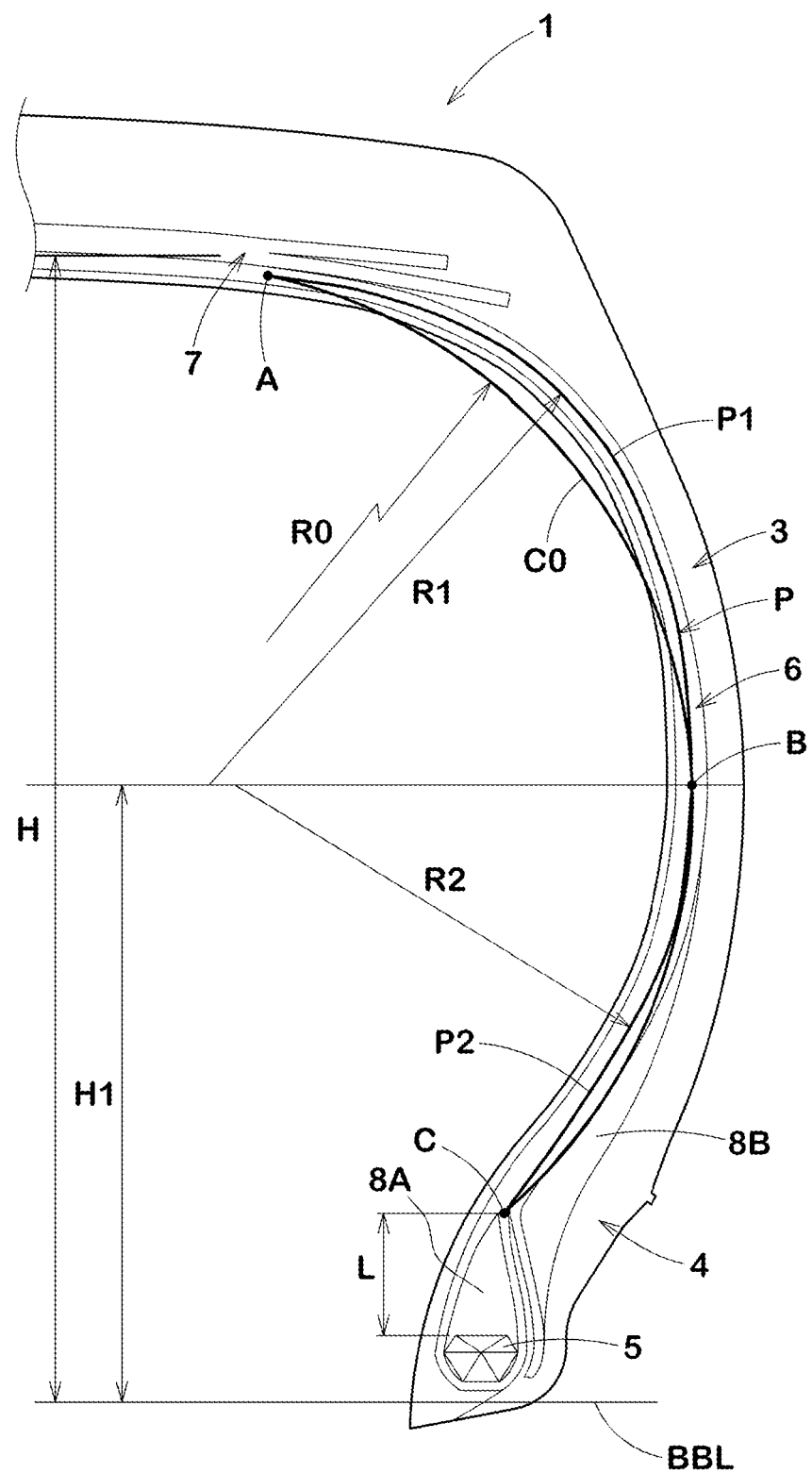
FIG. 2 is a cross-sectional view of the pneumatic tire under an unloaded condition inflated with an inner pressure at 50 kPa.

FIG. 2 illustrates a profile P of the carcass layer 6 of the pneumatic tire 1 under an unloaded condition such that the tire 1 is mounted onto the standard wheel rim and inflated with an inner pressure at 50 kPa (hereinafter referred to as "50 kPa condition"). The profile P of the carcass layer 6, for example, is defined as a centerline of the carcass layer 6 in a thickness direction. Further, the profile P of the carcass layer 6 may be defined as an outer surface profile (the surface in contact with the sidewall rubber) or an inner surface profile (the surface in contact with the inner liner layer 10) of the carcass layer 6. Furthermore, when the pneumatic tire 1 has the inner liner layer 10 having a substantially constant thickness, the profile P of the carcass layer 6 is defined as an inner surface of the inner liner layer 10, i.e., the tire inner cavity surface.

The profile P of the carcass layer 6 of the pneumatic tire 1 includes an outer side portion P1 and an inner side portion P2.

The outer side portion P1 is a profile extending from a position A where the carcass layer 6 separates from the belt layer 7 near an axially outer end of the belt layer 7 to a maximum width position B of the carcass layer 6.

As illustrated in FIG. 2, when the tire has the structure that the carcass layer 6 and the belt layer 7 are in direct contact with each other in the tread portion 2, the position A where the carcass layer 6 separates from the belt layer 7 corresponds to the outermost position in the tire axial direction where the both come into contact with each other. On the other hand, when the tire has the structure that another member is disposed between the carcass layer 6 and the belt layer 7, the position A corresponds to the first place where the carcass layer 6 and the belt layer 7 are no longer parallel. In other words, the position A corresponds to the position where binding force applied to the carcass layer 6 by the belt layer 7 decreases sharply.

The position A and the maximum width position B are parts of the profile P. Thus, the position A and the maximum width position B may be defined as positions on either the centerline of the carcass layer 6 in the thickness direction, the outer side surface of the carcass layer 6, the inner side surface of the carcass layer 6, or the tire inner cavity surface. In the present application, unless otherwise noted, the position A and the maximum width position B are defined using the centerline of the carcass layer 6 in the thickness direction as the positions corresponding to (i.e., closest to) the position A and the maximum width position B.

The inner side portion P2 is a profile that extends from the maximum width position B to an outermost end C of the first bead apex rubber component 8A. Like the maximum width position B, the outermost end C may be defined as a position on either the centerline of the carcass layer 6 in the thickness direction, the outer side surface of the carcass, the inner side surface of the carcass, or the tire inner cavity surface. In the present application, unless otherwise noted, the outermost end C is defined using the centerline of the carcass layer 6 in the thickness direction as the position corresponding to the outermost end C.

In the profile P of the pneumatic tire 1 according to the present embodiment, the outer side portion P1 is located outside a virtual arc C0. The virtual arc C0 is defined as an arc having a single radius R0 of curvature passing through the position A, the maximum width position B and the outermost end C in the tire radial direction of the first bead apex rubber component 8A.

In the pneumatic tire 1, the carcass layer 6 deforms so as to have a single curvature with inflating from the 50 kPa condition to the standard internal pressure. In the present embodiment, the outer side portion P1 of the profile P of the carcass layer 6 is located outside the virtual arc C0 in the 50 kPa condition. Thus, when filling up to the standard internal pressure, an amount of swelling at a shoulder portion of the profile P is smaller than an amount of swelling at a crown portion of the profile P. That is, the outer side portion P1 is pulled inwardly relative to the profile P of the carcass layer 6 at the crown portion. As a result, the ground contact pressure around the crown portion of the tread portion 2 increases, while the ground contact pressure around the shoulder portion decreases, reducing rolling resistance of the tire. Then, while the stress borne by the crown portion increases, the stress borne by the shoulder portion and the sidewall portion 3 decreases. Thus, damage at the ends of the belt plies 7A and 7B can be suppressed, and separation on the carcass layer 6 can be suppressed. As a result, it is possible to simplify the structure of the carcass layer 6 while ensuring durability performance of the bead portions 4, and which makes it possible to easily reduce rolling resistance of the pneumatic tire 1. In addition, reducing weight and cost of the pneumatic tire 1 can also be achieved easily.

Figure 3:
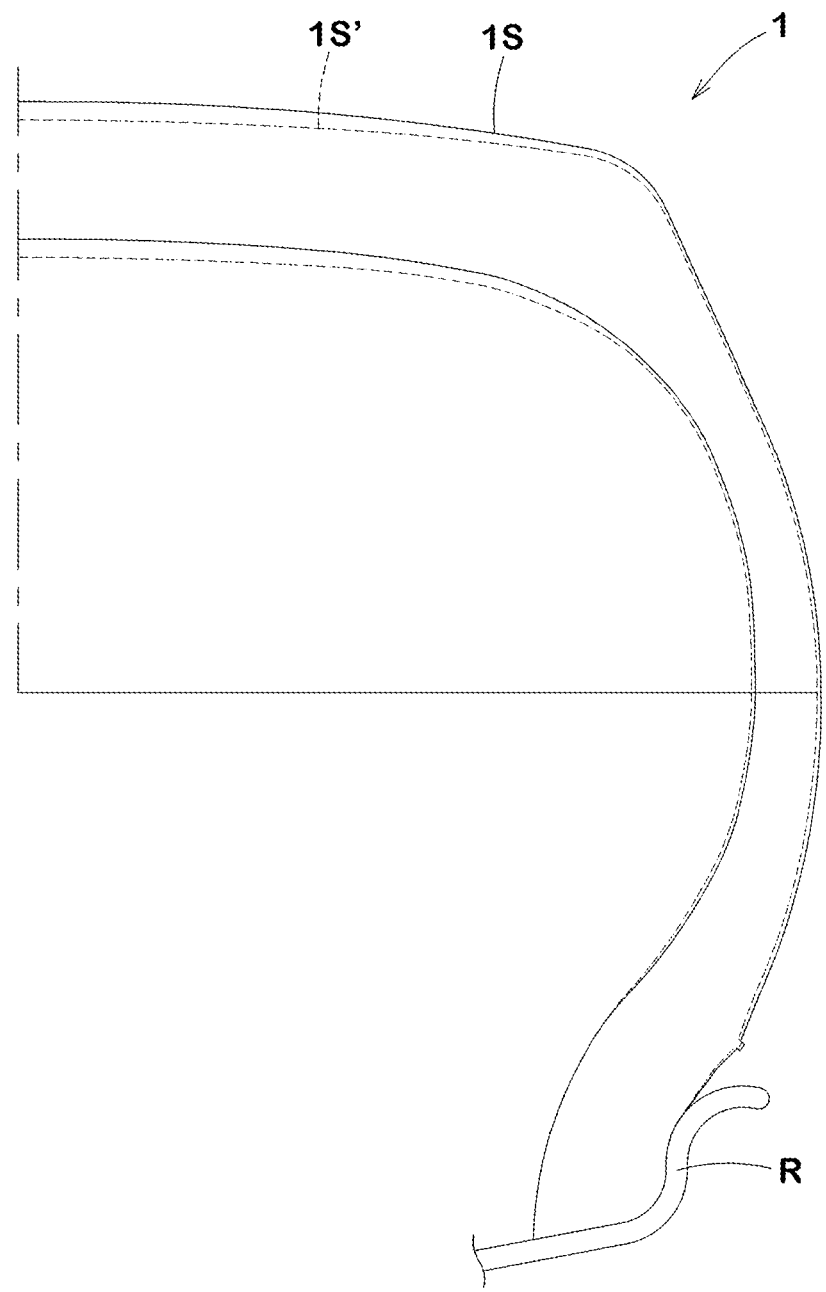
FIG. 3 is overlapping profiles of the pneumatic tire under an unloaded condition inflated with an internal pressure at 50 kPa and a standard internal pressure.

FIG. 3 illustrates tire outer surfaces of the pneumatic tire 1. The solid line shows a tire outer surface 1S under an unloaded condition inflated with the standard internal pressure, and the broken line shows a tire outer surface 1S' under an unloaded condition inflated with an internal pressure at 50 kPa.

In the pneumatic tire 1, it is preferable that an entire tire outer surface 1S in the unloaded condition inflated with the standard internal pressure, except for a portion that is in contact with the standard wheel rim R, is located outside the tire outer surface 1S' in the unloaded condition inflated with 50 kPa. In other words, it is preferable that the tire outer surface 1S bulges outwardly from the tire outer surface 1S' at any position corresponding to the profile P from one of the outermost ends C to the other one of the outermost end C. As a result, compression distortion does not occur in the carcass layer 6, and durability performance can further be improved. In addition, rolling resistance of the pneumatic tire 1 can be easily reduced without deteriorating the durability performance.

As illustrated in FIG. 2, in the profile P in an unloaded condition inflated with an internal pressure at 50 kPa, a radius R2 of curvature of the inner side portion P2 is preferably in a range from 0.8 to 0.95 times the radius R1 of curvature of the outer side portion P1.

When the radius R2 of curvature is equal to or more than 0.8 times the radius R1 of curvature, a tension generated in the carcass layer 6 may be made uniform on both sides of the maximum width position B so that durability performance of the carcass layer 6 is further improved. On the other hand, when the radius R2 of curvature is equal to or less than 0.95 times the radius R1 of curvature, tension generated in the carcass layer 6 from the maximum width position B to the bead portion 4 is reduced, and thus durability performance of the carcass layer 6 can further be improved. This makes it possible to easily reduce rolling resistance of the pneumatic tire 1 without deteriorating durability performance of the bead portions 4. It is preferable that the above-mentioned relationship between the radius R2 of curvature and the radius R1 of curvature is satisfied at least in portion.

It is preferable that a distance H1 in the tire radial direction from a bead baseline BBL to the maximum width position B is in a range from 0.40 to 0.50 times a maximum distance H in the tire radial direction from the bead baseline BBL to the profile P. In such a profile P, durability performance of the bead portion 4 may further be improved. This makes it possible to easily reduce the rolling resistance of the pneumatic tire 1 without deteriorating durability performance of the bead portion 4.

Figure 4:
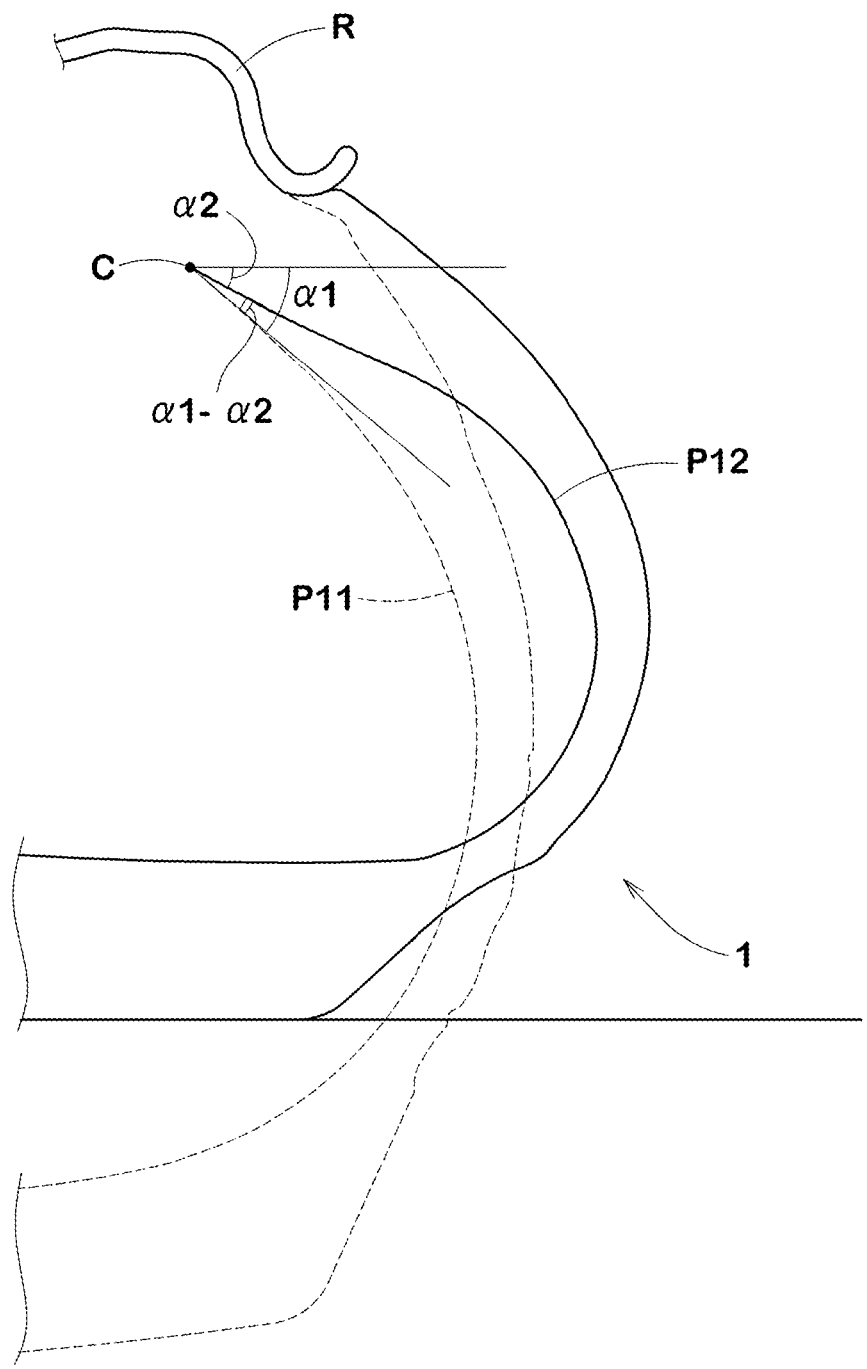
FIG. 4 is overlapping carcass profiles of the pneumatic tire under an unloaded condition and a loaded condition loaded with a standard tire load.

FIG. 4 illustrates a profile of the carcass layer 6 of the pneumatic tire 1 inflated with the standard internal pressure. The dashed line shows a profile P11 with no loaded, and the solid line shows a profile P12 with a standard tire load.

As used herein, the "standard tire load" is a tire load officially approved for each tire by standards organizations in which the pneumatic tire 1 is based, wherein the standard tire load is the "maximum load capacity" in JATMA, the maximum value given in the above-mentioned table in TRA, the "Load Capacity" in ETRTO, for example. When the pneumatic tire is a passenger car tire, the standard tire load, for example, may be a load corresponding to 88% of the above-mentioned load.

Preferably, the difference $\alpha 1-\alpha 2$ between an angle $\alpha 1$ of the profile P11 of the carcass layer with respect to a tire axial direction at the outermost end C in the unloaded condition and an angle $\alpha 2$ of the profile P12 of the carcass layer 6 with respect to the tire axial direction at the outermost end C in the loaded condition loaded with the standard tire load is 0 to 15 degrees. In such a pneumatic tire 1, the stress acting on the first bead apex rubber components 8A is reduced with the filling of the standard internal pressure, and durability performance of the bead portions 4 can further be improved. This makes it possible to easily reduce rolling resistance of the pneumatic tire 1 without deteriorating durability performance of the bead portions 4.

Note that in the pneumatic tire having the above-mentioned distance H1 being in a range from 0.40 to 0.50 times the above-mentioned maximum distance H, it is possible to easily set the above-mentioned difference $\alpha 1-\alpha 2$ in the range of 0 to 15 degrees so that rolling resistance of the pneumatic tire 1 can further be reduced.

When the distance H1 is 0.40 times or more of the maximum distance H, the profile P of the carcass layer 6 becomes close to an equilibrium shape (single R) when the internal pressure is inflated. At that time, the angle $\alpha 1$ tends to become smaller, and as a result, the above difference $\alpha 1-\alpha 2$ tends to fall within a predetermined range. On the other hand, when the distance H under the 50 kPa condition is 0.50 times or less of the maximum distance H, deformation of the first bead apex rubber components 8A when filling the standard internal pressure and being loaded with the standard tire load is suppressed, and thus durability performance of the bead portions 4 can further be improved. From the above viewpoint, the more desirable distance H1 is in a range from 0.44 to 0.48 times the maximum distance H.

Referring back to FIG. 1, the carcass ply 6A includes a main portion 6a extending between the pair of bead cores 5, and a pair of turn-up portions 6b turned up around the pair of bead cores 5 from inside to outside of the tire. In the present embodiment, the pneumatic tire 1 has a so-called high turn-up structure in which the outermost ends 61 of the pair of turn-up portions 6b is located outwardly in the tire radial direction of the maximum width position B. As illustrated in FIG. 2, preferably, a pair of second bead apex rubber components 8B is disposed outward in the tire axial direction of the pair of turn-up portions 6b. The second bead apex rubber components 8B can improve durability performance of the bead portions 4.

In the pneumatic tire 1 according to the present embodiment, the carcass ply 6B is disposed outward in the tire axial direction of the turn-up portions 6b, and the second bead apex rubber components 8B are disposed outwardly in the tire axial direction of the carcass ply 6B. This structure can improve durability performance of the bead portions 4 further.

Preferably, a length L in the tire radial direction of pair of the first bead apex rubber components 8A is in a range from 10 to 25 mm. The length L, for example, is defined as a distance in the tire radial direction from an uppermost end of the bead cores 5 to the outermost ends of the pair of first bead apex rubber components 8A.

When the length L is equal to or more than 10 mm, bending of the carcass layer 6 is suppressed, and durability performance can be ensured by reducing distortion applied to the carcass layer 6. Further, since the turn-up portions 6b of the carcass ply 6A as well as the carcass ply 6B are arranged inwardly in the tire axial direction, compressive stress acting on the turn-up portions 6b and the carcass ply 6B under being loaded is reduced. As a result, durability performance of the bead portions 4 can further be improved.

Preferably, the outermost ends in the tire radial direction of the second bead apex rubber components 8B are located inwardly in the tire radial direction of the maximum width position B. Thus, rolling resistance of the pneumatic tire 1 can be reduced easily.

Preferably, the innermost ends in the tire radial direction of the second bead apex rubber components 8B are located outwardly in the tire radial direction of the bead baseline BBL. Thus, rolling resistance of the pneumatic tire 1 can be reduced easily.

Although the pneumatic tire 1 of the present invention has been described in detail above, the present invention is not limited to the above specific embodiment, but can be modified to various embodiments. For example, the carcass layer 6 may include one or three or more carcass plie. In addition, the height of the outermost ends of the turn-up portions 6b are not limited to the aspect as shown in FIG. 1.

EXAMPLE

Pneumatic tires of size 205/75R16 with the basic structure of FIG. 1 were prototyped based on the specifications in Table 1 and evaluated for bead durability, tire mass, and fuel efficiency. The test methods are as follows.

Bead Durability Performance Test:

Each prototype tire was mounted on a rim of 5.50×16 and ran for 30,000 km under the conditions of an internal pressure of 525 kPa, a load of 15.74 kN, and a speed of 80 km/h using a drum tester. Each tire after running was disassembled, and then checked the degree of damage. The test results are shown in Table 1 using an index with Reference as 100, and the larger the value, the better the bead durability performance.

Tire Mass Test:

The mass of each prototype tire was measured. The test results are shown in table 1 using an index with Reference as 100, and the larger the value, the lighter the weight.

Fuel Efficiency Performance Test:

Each prototype tire was mounted on a rim of 5.50×16, and rolling resistance was measured using a rolling resistance tester under the conditions of an internal pressure of 525 kPa, a load of 9.59 kN, and a speed of 80 km/h. The test results are shown in Table 1 as an index with Reference as 100. The larger the value, the smaller the rolling resistance and the better.

TABLE 1

|  | Ref. | Ex. 1 |
| --- | --- | --- |
| Number of carcass plies | 3 | 2 |
| Location of outer side portion | inside virtual arc | outside virtual arc |
| Bead durability performance (index) | 100 | 100 |
| Tire mass (index) | 100 | 110 |
| Fuel efficiency performance (index) | 100 | 110 |

As apparent from Table 1, it was confirmed that the pneumatic tires of the example had a lighter tire mass and significantly improved fuel efficiency performance as compared with the Reference.

Pneumatic tires of size 205/75R16 with the basic structure of FIG. 1 were prototyped based on the specifications in Table 2 and evaluated for bead durability, tire mass, and fuel efficiency. The test methods are as follows.

Bead Durability Performance Test:

Similar to the tires in Table 1, the degree of damage to each prototype tire was confirmed. The test results are shown in Table 2 using an index with Example 3 as 100, and the larger the value, the better the bead durability performance.

Tire Mass Test:

The mass of each prototype tire was measured. The test results are shown in Table 2 using an index with Example 3 as 100, and the larger the value, the lighter the weight.

Fuel Efficiency Performance Test:

Similar to the tires in Table 1, rolling resistance of each prototype tire was measured. The test results are shown in Table 2 as an index with Example 3 as 100. The larger the value, the smaller the rolling resistance.

TABLE 2

|  | Ex. 2 | Ex. 3 | Ex. 4 | Ex. 5 |
| --- | --- | --- | --- | --- |
| Number of carcass plies | 2 | 2 | 2 | 2 |
| Location of outer side portion | outside virtual arc | outside virtual arc | outside virtual arc | outside virtual arc |
| R2/R1 | 0.75 | 0.80 | 0.95 | 1.00 |
| Bead durability performance (index) | 100 | 100 | 100 | 100 |
| Tire mass (index) | 98 | 100 | 100 | 98 |
| Fuel efficiency performance (index) | 98 | 100 | 100 | 98 |

Pneumatic tires of size 205/75R16 with the basic structure of FIG. 1 were prototyped based on the specifications in Table 3 and evaluated for bead durability, tire mass, and fuel efficiency. The test methods are as follows.

Bead Durability Performance Test:

Similar to the tires in Table 1, the degree of damage to each prototype tire was confirmed. The test results are shown in Table 3 using an index with Example 7 as 100, and the larger the value, the better the bead durability performance.

Tire Mass Test:

The mass of each prototype tire was measured. The test results are shown in Table 3 using an index with Example 7 as 100, and the larger the value, the lighter the weight.

Fuel Efficiency Performance Test:

Similar to the tires in Table 1, rolling resistance of each prototype tire was measured. The test results are shown in Table 3 using as an index with Example 7 as 100. The larger the value, the smaller the rolling resistance.

TABLE 3

|  | Ex. 6 | Ex. 7 | Ex. 8 | Ex. 9 |
|---|---|---|---|---|
| Number of carcass plies | 2 | 2 | 2 | 2 |
| Location of outer side portion | outside virtual arc | outside virtual arc | outside virtual arc | outside virtual arc |
| H1/H | 0.35 | 0.40 | 0.50 | 0.55 |
| Bead durability performance (index) | 100 | 100 | 100 | 100 |
| Tire mass (index) | 98 | 100 | 100 | 98 |
| Fuel efficiency performance (index) | 98 | 100 | 100 | 98 |

Pneumatic tires of size 205/75R16 with the basic structure of FIG. 1 were prototyped based on the specifications in Table 4, and bead durability, tire mass, and fuel efficiency were evaluated. The test methods are as follows.

Bead Durability Performance Test:

Similar to the tires in Table 1, the degree of damage to each prototype tire was confirmed. The test results are shown in Table 4 using an index with Example 11 as 100, and the larger the value, the better the bead durability performance.

Tire Mass Test:

The mass of each prototype tire was measured. The test results are shown in Table 4 using an index with Example 11 as 100, and the larger the value, the lighter the weight.

Fuel Efficiency Performance Test:

Similar to the tires in Table 1, rolling resistance of each prototype tire was measured. The test results are shown in Table 4 using an index with the value of Example 11 as 100. The larger the value, the smaller the rolling resistance.

TABLE 4

|  | Ex. 10 | Ex. 11 | Ex. 12 |
|---|---|---|---|
| Number of carcass plies | 2 | 2 | 2 |
| Location of outer side portion | outside virtual arc | outside virtual arc | outside virtual arc |
| Difference α1 − α2 (deg.) | 13 | 15 | 17 |
| Bead durability performance (index) | 100 | 100 | 100 |
| Tire mass (index) | 100 | 100 | 103 |
| Fuel efficiency performance (index) | 100 | 100 | 103 |

Pneumatic tires of size 205/75R16 with the basic structure of FIG. 1 were prototyped based on the specifications in Table 5, and bead durability, tire mass, and fuel efficiency were evaluated. The test methods are as follows.

Bead Durability Performance Test:

Similar to the tires in Table 1, the degree of damage to each prototype tire was confirmed. The test results are shown in Table 5 using an index with Example 14 as 100, and the larger the value, the better the bead durability performance.

Tire Mass Test:

The mass of each prototype tire was measured. The test results are shown in Table 5 using an index with Example 14 as 100, and the larger the value, the lighter the weight.

Fuel Efficiency Performance Test:

Similar to the tires in Table 1, rolling resistance of each prototype tire was measured. The test results are shown in Table 5 using an index with the value of Example 14 as 100. The larger the value, the smaller the rolling resistance.

TABLE 5

|  | Ex. 13 | Ex. 14 | Ex. 15 | Ex. 16 |
|---|---|---|---|---|
| Number of carcass plies | 2 | 2 | 2 | 2 |
| Location of outer side portion | outside virtual arc | outside virtual arc | outside virtual arc | outside virtual arc |
| L (mm) | 8 | 10 | 25 | 27 |
| Bead durability performance (index) | 95 | 100 | 105 | 105 |
| Tire mass (index) | 103 | 100 | 95 | 93 |
| Fuel efficiency performance (index) | 103 | 100 | 95 | 93 |

What is claimed is:

1. A light truck pneumatic radial tire comprising:
a tread portion;
a pair of sidewall portions;
a pair of bead cores;
a carcass layer comprising at least one carcass ply extending between the pair of bead cores through the tread portion and the pair of sidewall portions;
a pair of first bead apex rubber components each disposed outward in a tire radial direction of a respective one of the pair of bead cores; and
a belt layer disposed outward in the tire radial direction of the carcass layer,
wherein
the light truck pneumatic radial tire has a standard internal pressure of 350 to 600 kPa,
in an unloaded condition where the tire is mounted onto a standard wheel rim and inflated with an internal pressure at 50 kPa, the carcass layer has a profile in cross-section on each axial side of the tire that comprises an outer side portion, the outer side portion extending from an axial position A where the carcass layer separates from the belt layer near an outer end of the belt layer in the tire axial direction to a maximum width position B of the carcass layer profile,
the respective outer side portion is located outside a virtual arc C0 having a single radius R0 of curvature passing through the position A, the maximum width position B, and an axial position C of an outermost end in the tire radial direction of a respective one of the pair of first bead apex rubber components, and
a distance H1 in the tire radial direction from a bead baseline to the respective maximum width position B is in a range from 0.40 to 0.50 times a maximum distance in the tire radial direction from the bead baseline to the profile.

2. The light truck pneumatic radial tire according to claim 1, wherein an entire tire outer surface in an unloaded condition where the tire is mounted onto the standard wheel rim and inflated with the standard internal pressure, except for the portion that is in contact with the standard wheel rim, is located outside an entire tire outer surface in the unloaded condition where the tire is mounted onto the standard wheel rim and inflated with the internal pressure at 50 kPa, except for the portion that is in contact with the standard wheel rim.

3. The light truck pneumatic radial tire according to claim 2, wherein
in the unloaded condition where the tire is mounted onto the standard rim and inflated with the internal pressure at 50 kPa, the profile comprises an inner side portion extending from the maximum width position B to the outermost end position C, the profile being an arc having a single radius R1 of curvature of the outer side portion from the position A to the maximum width position B and a single radius R2 of curvature of the inner side portion from the maximum width portion B to the outermost end position C, and the radius R2 of curvature of the inner side portion is in a range from 0.8 to 0.95 times the radius R1 of curvature of the outer side portion.

4. The light truck pneumatic radial tire according to claim 2, wherein a difference α1−α2 between an angle α1 of the carcass layer profile with respect to a tire axial direction at the outermost end position C in the unloaded condition where the tire is mounted onto the standard wheel rim and inflated with the standard internal pressure and an angle α2 of the carcass layer profile with respect to the tire axial direction at the outermost end position C in a loaded condition where the tire is mounted onto the standard wheel rim with the standard internal pressure and loaded with a standard tire load is 0 to 15 degrees.

5. The light truck pneumatic radial tire according to claim 2, wherein a length L in the tire radial direction of the pair of first bead apex rubber components is in a range from 10 to 25 mm.

6. The light truck pneumatic radial tire according to claim 1, wherein in the unloaded condition where the tire is mounted onto the standard rim and inflated with the internal pressure at 50 kPa, the profile comprises an inner side portion extending from the maximum width position B to the outermost end position C, the profile being an arc having a single radius R1 of curvature of the outer side portion from the position A to the maximum width position B and a single radius R2 of curvature of the inner side portion from the maximum width portion B to the outermost end position C, and the radius R2 of curvature of the inner side portion is in a range from 0.8 to 0.95 times the radius R1 of curvature of the outer side portion.

7. The light truck pneumatic radial tire according to claim 6, wherein a difference α1−α2 between an angle α1 of the carcass layer profile with respect to a tire axial direction at the outermost end position C in the unloaded condition where the tire is mounted onto the standard wheel rim and inflated with the standard internal pressure and an angle α2 of the carcass layer profile with respect to the tire axial direction at the outermost end position C in a loaded condition where the tire is mounted onto the standard wheel rim with the standard internal pressure and loaded with a standard tire load is 0 to 15 degrees.

8. The light truck pneumatic radial tire according to claim 6, wherein a length L in the tire radial direction of the pair of first bead apex rubber components is in a range from 10 to 25 mm.

9. The light truck pneumatic radial tire according to claim 1, wherein a difference α1−α2 between an angle α1 of the carcass layer profile with respect to a tire axial direction at the outermost end position C in an unloaded condition where the tire is mounted onto the standard wheel rim and inflated with the standard internal pressure and an angle α2 of the carcass layer profile with respect to the tire axial direction at the outermost end position C in a loaded condition where the tire is mounted onto the standard wheel rim with the standard internal pressure and loaded with a standard tire load is 0 to 15 degrees.

10. The light truck pneumatic radial tire according to claim 9, wherein a length L in the tire radial direction of the pair of first bead apex rubber components is in a range from 10 to 25 mm.

11. The light truck pneumatic radial tire according to claim 1, wherein a length L in the tire radial direction of the pair of first bead apex rubber components is in a range from 10 to 25 mm.

12. The light truck pneumatic radial tire according to claim 1, wherein one of the at least one carcass ply comprises a main portion and a pair of turn-up portions turned up around the pair of bead cores from inside to outside of the tire, a pair of second bead apex rubber components is each disposed outward in the tire axial direction of a respective one of the pair of turn-up portions, and an outermost end in the tire radial direction of each of the pair of second bead apex rubber components is located inwardly in the tire radial direction of the respective maximum width position B.

13. The light truck pneumatic radial tire according to claim 1, wherein one of the at least one carcass ply comprises a main portion and a pair of turn-up portions turned up around the pair of bead cores from inside to outside of the tire, a pair of second bead apex rubber components is each disposed outward in the tire axial direction of a respective one of the pair of turn-up portions, and an innermost end in the tire radial direction of each of the pair of second bead apex rubber components is located outwardly in the tire radial direction of the bead baseline.

14. The light truck pneumatic radial tire according to claim 1, wherein the distance H1 is in a range from 0.44 to 0.48 times the maximum distance in the tire radial direction from the bead baseline to the profile.

* * * * *